(12) United States Patent
Sullivan et al.

(10) Patent No.: US 10,926,779 B1
(45) Date of Patent: Feb. 23, 2021

(54) METHOD AND SYSTEM FOR CONTROLLING A VEHICLE

(71) Applicant: Ford Global Technologies, LLC, Dearborn, MI (US)

(72) Inventors: Jonathan Sullivan, Ferndale, MI (US); Jianbo Lu, Northville, MI (US); Sanghyun Hong, Ann Arbor, MI (US); Zhengyu Dai, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/549,081

(22) Filed: Aug. 23, 2019

(51) Int. Cl.
| | | |
|---|---|---|
| *B60W 50/08* | (2020.01) | |
| *B60W 40/109* | (2012.01) | |
| *B60W 50/14* | (2020.01) | |
| *B60W 30/045* | (2012.01) | |
| *B60W 30/18* | (2012.01) | |
| *B60W 50/00* | (2006.01) | |

(Continued)

(52) U.S. Cl.
CPC ........ *B60W 50/085* (2013.01); *B60W 30/045* (2013.01); *B60W 30/18145* (2013.01); *B60W 40/109* (2013.01); *B60W 50/14* (2013.01); *B60K 6/28* (2013.01); *B60W 20/00* (2013.01); *B60W 2050/0026* (2013.01); *B60W 2050/0083* (2013.01); *B60W 2520/10* (2013.01); *B60W 2520/125* (2013.01); *B60W 2530/00* (2013.01); *B60W 2540/10* (2013.01); *B60W 2556/60* (2020.02); *B60W 2710/1005* (2013.01); *B60Y 2200/91* (2013.01); *B60Y 2200/92* (2013.01)

(58) Field of Classification Search
None
See application file for complete search history.

(56) References Cited

U.S. PATENT DOCUMENTS

| | | | | |
|---|---|---|---|---|
| 6,208,927 B1 * | 3/2001 | Mine | .................. | B60K 31/0083 |
| | | | | 701/70 |
| 6,970,779 B2 * | 11/2005 | Kagawa | ............. | B60K 31/0058 |
| | | | | 701/93 |

(Continued)

FOREIGN PATENT DOCUMENTS

| | | | | |
|---|---|---|---|---|
| DE | 10007959 A1 * | 8/2001 | ............. | F02N 15/06 |
| WO | WO-0188369 A1 * | 11/2001 | ........... | F02N 15/006 |
| WO | 2017177110 A1 | 10/2017 | | |

*Primary Examiner* — Dirk Wright
(74) *Attorney, Agent, or Firm* — Brooks Kushman P.C.; David Kelley

(57) ABSTRACT

A vehicle has an accelerator pedal in communication with a prime mover, a transmission, and a controller. The controller is configured to, in response to receiving a first input indicative of a vehicle state and a second input indicative of a curve along a vehicle path within a predetermined time interval, downshift the transmission and modify a driver torque request map associated with the accelerator pedal to reduce a percentage of pedal travel associated with positive drive torque. A method of controlling a vehicle includes downshifting a transmission and modifying a driver torque request map associated with an accelerator pedal to reduce a percentage of pedal travel associated with positive drive torque when a vehicle state and a curve from an electronic horizon system predict a vehicle lateral acceleration in the curve being above a first threshold value.

20 Claims, 3 Drawing Sheets

(51) Int. Cl.
*B60W 20/00* (2016.01)
*B60K 6/28* (2007.10)

(56) References Cited

U.S. PATENT DOCUMENTS

| | | | | |
|---|---|---|---|---|
| 7,266,438 B2 * | 9/2007 | Kellum | ............... | G01C 21/26 |
| | | | | 340/436 |
| 7,751,973 B2 * | 7/2010 | Ibrahim | ............... | G01C 21/30 |
| | | | | 701/412 |
| 8,275,531 B2 * | 9/2012 | Ito | .................. | B60W 40/105 |
| | | | | 701/70 |
| 8,698,649 B2 * | 4/2014 | Denaro | ............... | G01C 21/26 |
| | | | | 340/905 |
| 8,892,329 B2 * | 11/2014 | Yasui | ............... | B60W 30/146 |
| | | | | 701/72 |
| 9,120,462 B2 * | 9/2015 | Jonsson | ......... | B60W 30/18145 |
| 9,145,147 B1 | 9/2015 | Lu et al. | | |
| 9,689,706 B2 | 6/2017 | Denaro | | |
| 10,648,817 B2 * | 5/2020 | Denaro | ............ | G01C 21/3697 |
| 2014/0142822 A1 | 5/2014 | Li | | |
| 2018/0222478 A1 | 8/2018 | Limbacher | | |

\* cited by examiner

METHOD AND SYSTEM FOR CONTROLLING A VEHICLE

TECHNICAL FIELD

Various embodiments relate to a vehicle with an electronic horizon system, and a method of controlling the vehicle, to limit lateral acceleration of the vehicle in a curve.

BACKGROUND

When a vehicle is traveling along a roadway or path, the vehicle may encounter a curve such as a blind curve. A blind curve is a curve where the apex or minimum radius of the turn is obstructed by objects in the driver's field of view. As such, it is difficult for the driver to gauge an appropriate entry speed for the curve. As the vehicle speed increases in a curve, the lateral acceleration on the vehicle likewise increases. Currently, yaw control methods may be employed by the vehicle, for example, with the vehicle in a curve and experiencing a lateral acceleration above a threshold value. Alternatively, a shift schedule of the vehicle may be modified as described in U.S. Patent Publication No. 2014/0142822 or PCT Publication No. WO 2017/177110 A1.

SUMMARY

In an embodiment, a vehicle is provided with an accelerator pedal in communication with a prime mover, a transmission, an electronic horizon system, and a controller in communication with the prime mover and the accelerator pedal, the transmission, and the electronic horizon system. The controller is configured to, in response to receiving a first input indicative of a vehicle state and a second input indicative of a curve along a vehicle path within a predetermined time interval from the electronic horizon system, downshift the transmission and modify a driver torque request map associated with the accelerator pedal to reduce a percentage of pedal travel associated with positive drive torque when the first and second inputs predict a vehicle lateral acceleration in the curve above a first threshold value.

In another embodiment, a method of controlling a vehicle is provided. A first signal indicative of a vehicle state is received. A second signal is received from an electronic horizon system indicative of a curve along a vehicle path within a predetermined time interval. A transmission is downshifted and a driver torque request map associated with an accelerator pedal is modified to reduce a percentage of pedal travel associated with positive drive torque when the vehicle state and the curve predict a vehicle lateral acceleration in the curve being above a first threshold value.

In yet another embodiment, a vehicle is provided with an accelerator pedal in communication with a prime mover, a transmission, and a controller. The controller is configured to, in response to receiving a first input indicative of a vehicle state and a second input indicative of a curve along a vehicle path within a predetermined time interval, downshift the transmission and modify a driver torque request map associated with the accelerator pedal to reduce a percentage of pedal travel associated with positive drive torque.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
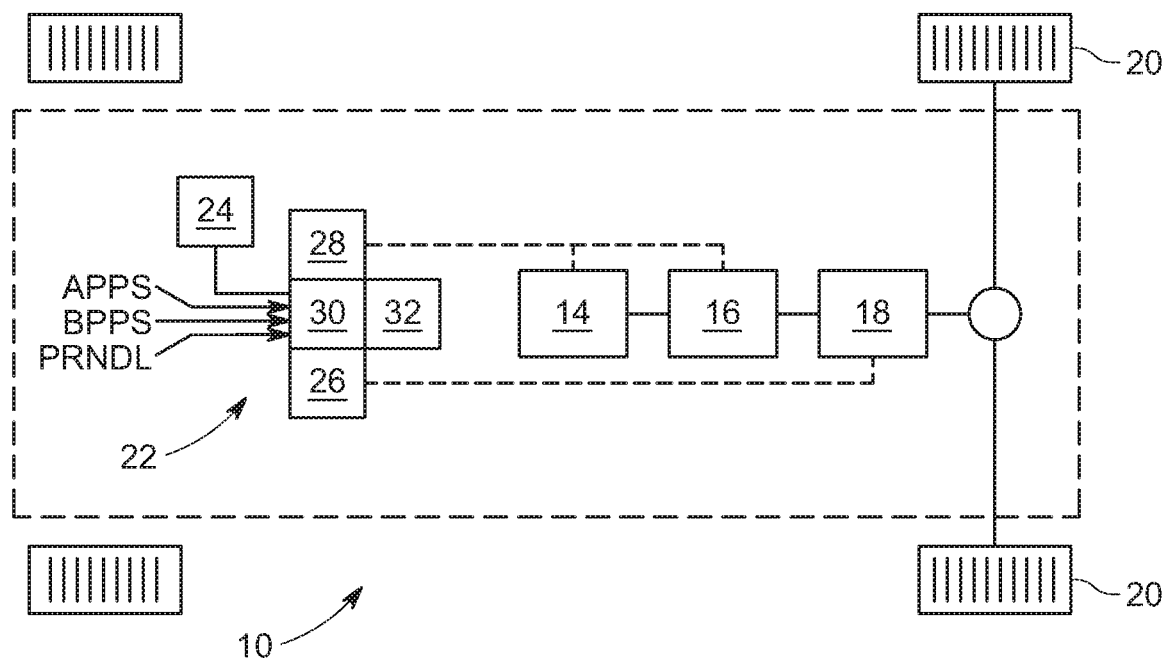
FIG. 1 illustrates a schematic of a vehicle according to an embodiment.

FIG. 1 illustrates a schematic of a vehicle 10 configured to implement the present disclosure. The vehicle 10 has one or more prime movers 12. In the present example, the vehicle has an internal combustion engine 14 that is used to propel the vehicle. In further examples, the vehicle 10 may additionally be provided with another prime mover, such as an electric machine 16 connected to a traction battery, such that the vehicle may be propelled using torque from the engine, the electric machine, or a combination thereof. In a further example, the vehicle 10 may be a fully electrified vehicle, such that the vehicle may be propelled solely using electric power from one or more electric machines. In various examples, the vehicle 10 may be provided as a hybrid vehicle, such as a parallel, power split, or series hybrid electric vehicle, a battery electric vehicle, start-stop vehicle, a micro-hybrid vehicle, a battery electric vehicle, a plug-in hybrid electric vehicle, or other vehicle system architectures with electric propulsion.

The prime mover(s) 12 for the vehicle output mechanical power to propel the vehicle. The prime mover(s) are connected to the driveline. The driveline includes the transmission 18, differential, and vehicle wheels 20, and their interconnecting components.

In some embodiments, the transmission 18 is an automatic transmission and connected to the drive wheels in a conventional manner, and may include a differential. The transmission may be a geared transmission, and may be a step ratio transmission or a continuously variable transmission. The vehicle 10 is also provided with a pair of non-driven wheels, however, in alternative embodiments, a transfer case and a second differential can be utilized to positively drive all of the vehicle wheels. The transmission 18 has a gear box to provide various gearing ratios for the vehicle 10. The transmission gearbox may include clutches and planetary gearsets, or other arrangements of clutches and gear trains as are known in the art. In alternative embodiments, the transmission 18 is a continuously variable transmission or automated mechanical transmission. The transmission may be an automatic six speed transmission, other speed automatic transmission, or other gearbox as is known in the art. Furthermore, the transmission 18 may be a semi-automatic transmission such as a manumatic that allows the driver to opt out of an automatic transmission mode, and manually and electronically control the transmission shifting via shift paddles or the like.

The transmission gearbox 18 may include gear sets (not shown) that are selectively placed in different gear ratios by selective engagement of friction elements such as clutches and brakes to establish the desired multiple discrete or step drive ratios. The friction elements are controllable through a shift schedule that connects and disconnects certain elements of the gear sets to control the ratio between a transmission output shaft and the transmission input shaft. The gearbox is automatically shifted from one ratio to another based on various vehicle and ambient operating conditions by an associated controller, such as a transmission control unit (TCU). The gearbox then provides powertrain output torque to output shaft.

The vehicle 10 has a control system 22 (or controller) with one or more controllers or control modules for the various vehicle components and systems. The control system 22 for the vehicle may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The vehicle is provided with a user interface 24, such as a human machine interface (HMI). The user interface 24 may provide a user notification system. The user interface 24 may be provided with a display screen, and may have buttons or other inputs for a vehicle occupant. The user interface 24 may additionally be provided with indicator lights, audible alerts, and the like. Furthermore, the user interface 24 may be provided with a microphone such that the vehicle occupant may provide an input to the user interface via a voice command.

The transmission 18 is controlled using the transmission control unit (TCU) 26 or the like to operate on a shift schedule, such as a production shift schedule, that connects and disconnects elements within the gear box to control the gear ratio between the transmission output and transmission input.

The vehicle 10 is provided with a control unit for the prime movers (ECU) 28. The prime mover control unit 28 may be provided by more than one controller for the case of a vehicle with both an engine and an electric machine. The prime mover control unit 28 may have an accelerator pedal map as well as an engine map or electric machine map stored in memory.

A vehicle system controller (VSC) 30 transfers data between the TCU 26 and ECU 28 and is also in communication with various vehicle sensors and the user interface 24. The control system 22 for the vehicle 10 may include any number of controllers, and may be integrated into a single controller, or have various modules. Some or all of the controllers may be connected by a controller area network (CAN) or other system. The control system may be configured to control operation of the various components of the transmission, and the prime mover(s) under any of a number of different conditions, including according to a method as described below.

The VSC 30 receives signals indicative of driver demand. An accelerator pedal position sensor (APPS) is in communication with the VSC, and provides information related to the accelerator pedal position, or tip in and tip out of the accelerator pedal. Tip in may be used in relation to a request from the driver for more speed, power, and/or torque, while tip out may be used in relation to a request from the driver for less speed, power, and/or torque. The brake pedal position sensor (BPPS) and gear selection (PRNDL) are also in communication with the VSC to provide information related to driver demand.

Under normal powertrain conditions, the VSC 30 interprets the driver's demands (e.g. PRNDL and acceleration or braking requests via the accelerator and brake pedal inputs), and then determines the wheel torque command based on the driver demand and powertrain limits. In addition, the VSC 30 determines when and how much torque each prime mover 12 needs to provide in order to meet the driver's torque demand and to achieve the operating points (torque and speed) of the prime mover(s). The VSC 30 additionally determine the gear selection or gear ratio for the transmission 18 based on the production shift schedule.

The vehicle 10 may have speed sensors positioned at various locations of the powertrain and driveline. The speed sensors provide information to the control system 22 regarding the rotational speed of a shaft in approximately real time, although there may be some lag due to response time, and signal and data processing. In the embodiment shown in FIG. 1, there is a speed sensor that measures the speed of the prime mover(s) output shaft(s), the speed of the transmission input shaft, the speed of the transmission output shaft, and the speed of one or both of the axles connected to the wheels.

The vehicle has an electronic horizon system 32 that provides an indication of the surroundings of the vehicle 10 to the control system 22. The electronic horizon system 32 may include a navigation system for the vehicle with a global positioning system, to provide both a vehicle position and a map database. The map database may include detailed mapping information, such as that used with autonomous vehicles. The navigation system may include global positioning satellite data. The electronic horizon system 32 may additionally include sensors on the vehicle, such as cameras, radar, LIDAR, and the like. The electronic horizon system may be provided as a part of an advanced driver assistance system (ADAS), and the ADAS may be provided with adaptive cruise control. In some examples, the electronic horizon system 32 may be connected to a cloud, for example, using a connected-vehicle-to-everything communication (V2X) system.

The electronic horizon system 32 may contain or receive information related to conditions of the roadways, e.g. curvature, grade, and the like. The electronic horizon system 32 may additionally contain or receive additional information related to the roadways, such as designated speed limits or recommended speeds for the roadway, the road surface condition, e.g. rough versus smooth, and the like. Furthermore, the electronic horizon system 32 may receive information related to environmental conditions, such as weather conditions. For example, the electronic horizon system 32 may receive a signal from windshield wipers to indicate precipitation, from a temperature sensor to indicate possible ice or snow formation on the roadway, or from a remote signal with weather condition and forecasting data.

According to various embodiments, the control system 22 controls the vehicle 10 while the vehicle is experiencing a lateral load or force, this lateral force may be caused by the vehicle driving through a turn or a curve in a roadway. Often times roads have turns or curves where the apex or minimum radius of the turn is unpredictable by the driver or is obstructed by objects in the driver's field of view. This makes it difficult for a driver to gauge an entry speed for the vehicle into and through the turn. As the speed of the vehicle increases, the lateral force on the vehicle and its occupants also increases, and may be greater than is desired by the occupants. When a turn or curve is obstructed, the driver has a reduced reaction time to provide an input to the vehicle, such as by applying a braking force or reducing the accelerator pedal input, to slow the vehicle. Even when a curve or a turn is unobstructed and in clear view of the driver, it may be difficult to gauge the appropriate speed for the vehicle, and the vehicle may enter or be in the curve at a speed that is higher than desired, for example, based on current road conditions. For example, in a curve or turn with a decreasing radius, or with the apex of the turn being obstructed, it is difficult for a driver to appropriately gauge an the speed of the vehicle to a desired entry speed for the turn, and as a result, the entry speed may be greater than desired by the driver, resulting in higher lateral loads on the vehicle than intended by the driver.

According to the present disclosure, the control system 22 controls the vehicle 10 to intervene in a situation where the vehicle speed as requested by the driver is greater than a desired entrance speed to a turn or curve such that a higher lateral load would be imparted on the vehicle than desired without intervention by the control system. The electronic horizon system 32 provides an indication of the desired entrance speed or target speed for the vehicle.

Furthermore, the control system 22 controls the vehicle 10 without being apparant to the driver to maintain a connected driving feeling, and in a manner that maintains or increases fuel economy for the vehicle. The control method alerts the driver to the forthcoming curve and situation, and controls the vehicle 10 as described below to reduce vehicle speed through the curve, while still allowing the driver to override the control system and control the vehicle as the driver sees fit. Additionally, the control method controls the vehicle 10 such that the vehicle is capable to react quickly during and after these turning events, which may require high torque reserves and already being in a gear that is configured to provide a desired torque ratio.

According to the present disclosure, the control system 22 includes a model predictive controller, for example, integrated into the VSC 30, that accesses the electronic horizon system or other information related to future road preview to perform shift scheduling and pedal map modification based on a state estimation of the vehicle in a future corner. The future corner or curve may be the immediate next curve for the vehicle, and may be on the order of ten to fifteen seconds ahead of the vehicle based on the vehicle's present speed. Additionally, the control system 22 provides an alert to the driver, e.g. via the user interface, that the vehicle may be approaching a lateral load threshold. The alert may include an audible signal such as a chime, a visual indicator such as a dash, or a haptic signal or feedback to the driver. The alert using haptic feedback may be provided via the accelerator pedal, via the steering wheel, or the like.

Following the driver alert, the control system 22 may cause or induce a downshift in the transmission 18 (as opposed to a downshift commanded by the driver, or otherwise scheduled in the shift scheduler) to take advantage of engine braking to reduce the vehicle speed and alert the driver to slow down further. According to one example, the transmission downshifts commanded by the control system are equal torque shifts, but as the future vehicle speed predicted through the curve provides an indication of higher and higher lateral loads, a driver torque request map (such as an accelerator pedal map) may be modified by the control system 22 to reduce the amount of area in the pedal map that leads to positive torque, and further reduce the vehicle speed. For example, the accelerator pedal would need to travel a greater distance, or farther tip in, to result in a positive torque at the wheels. The accelerator pedal map modification favors a negative torque output at the wheels, corresponding to engine braking and reduced vehicle speed. The pedal map may be modified further for high predicted vehicle speeds and lateral loads through the curve. For example, for a given accelerator pedal position or percentage tip in, the torque request may be continuously decreased as the predicted lateral load increases while still ensuring that the pedal map includes the max torque available in the gear so that the driver can reach full tip in or open throttle and override the control system and modification if desired. Essentially the accelerator pedal map modification results in an accelerator pedal that feels more and more "dead" to the driver as the predicted lateral load through the curve increases.

The control system 22 includes, for example stored in memory, a model or algorithm for the lateral capability and loads for the vehicle during operation. The model may include a road performance index, e.g. coefficient of friction, to assess reasonable expectations of tire grip in future corners where the future curvature and target velocity are used to predict lateral acceleration and forces. The road performance index may be updated using environmental conditions and the like.

The control system 22 includes a method to determine how to control the vehicle 10 according to the present disclosure, and in a future curve or turn. The method may be provided with a cost function that applies cost weights to different vehicle states as inputs. In one example, the method applies cost weights to brake pressure, fuel rate, error from velocity target, and lateral acceleration beyond a threshold value. The control system 22 uses the cost function to determine an optimal coast down strategy for the vehicle based on the future physical limits of the curve ahead, e.g. curvature, radius, grade, and the like. The control system 22 modifies the shift schedule and the accelerator pedal map for the vehicle based on the optimal trajectory of the vehicle through the curve, and manipulated variables found by the method. The control system 22 modifies the shift schedule and selects an optimized gear to allow for torque reserve and engine braking potential. The control system 22 modifies the accelerator pedal map to bias the driver into reducing the vehicle speed with an upcoming curve, while alerting the driver of the future road condition. By alerting the driver of the upcoming curve, and then modifying the shift schedule and accelerator pedal map, the control system provides for reduced lateral acceleration and forces on the vehicle through the curve while maintaining drivability and rideability through the curve.

The method applied by the control system 22 uses road preview information and data provided by the electronic horizon system 32 to perform shift scheduling for the transmission 18 and accelerator pedal map modification based on state estimation of the vehicle 10 in an upcoming, future corner.

The control system 22 provides an alert to the driver that the lateral acceleration of the vehicle 10 will exceed a threshold value, and the alert may be provided by a chime, dash icon, haptic feedback, or the like. Then, the control system 22 induces and commands a transmission 18 downshift to utilize engine braking to slow the vehicle, and also provide an alert to the driver to further slow the vehicle speed if needed.

The control system 22 may preemptively modify the accelerator pedal map to reduce the amount of pedal travel that is associated with positive torque output at the wheels in order to favor engine braking as the predicted lateral acceleration of the vehicle increases. The accelerator pedal map still provides maximum torque from the prime mover(s) 12 within a smaller section or range of the pedal travel to allow the driver to override the system if they so choose.

Conventional vehicle control systems are dependent on intervention at the time of increased lateral vehicle acceleration, such as roll attenuation and other electronic stability control systems, or are completely autonomous and allow no driver control or input during the control event. The method according to the present disclosure provides for an automatic control of the vehicle 10 through a curve or during increased vehicle lateral acceleration, while providing for a connected driving feel, maintaining or increasing fuel economy, and overall driver and occupant satisfaction. Additionally since the method may be configured to gradually introduce and increase the control inputs in advance of the curve, fuel economy and vehicle control and stability are higher than when using a conventional reactionary control method.

The control system 22 and method according to the present disclosure includes accelerator pedal and brake pedal inputs into the cost function for the future horizon to plan transmission shifts or alter accelerator pedal/driver demand maps. The future horizon is based on an upcoming curvature in the roadway, e.g. within ten to fifteen seconds of the vehicle location at the present vehicle speed, and the present speed of the vehicle. The control system and method may provide an alert to the driver that a future speed of the vehicle (e.g. within the future horizon) will cause the lateral vehicle acceleration to exceed a threshold, or that an obstructed curve or corner is ahead, e.g. a blind apex.

Figure 2:
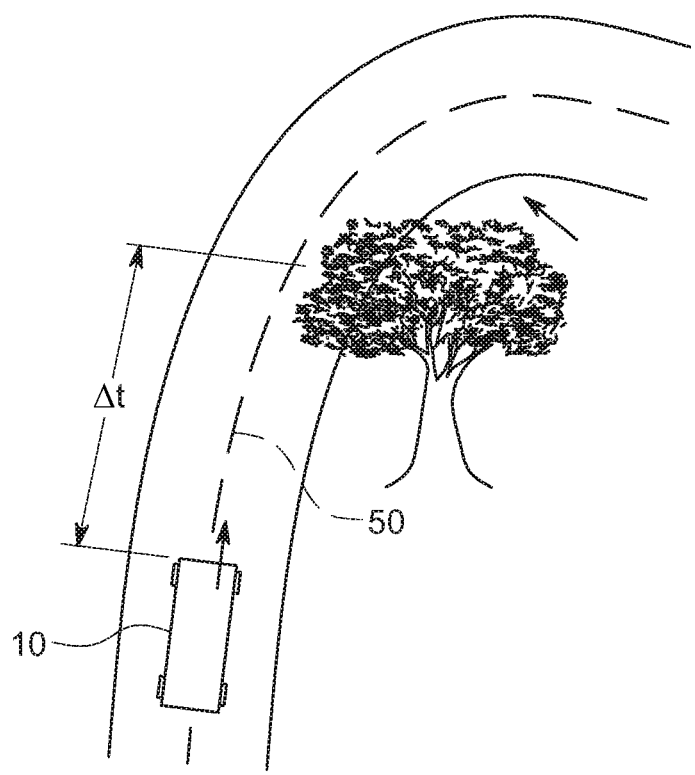
FIG. 2 illustrates a schematic of a vehicle along a path with a curve.

FIG. 2 illustrates a schematic of a vehicle 10 along a path 50 on a roadway. The vehicle 10 is driving along a curve on a vehicle path. Based on the vehicle path, the vehicle is approaching a curve 52 or turn in the roadway. As shown in the Figure, the curve 52 be a decreasing radius curve, although other types of curves are also contemplated. The curve 52 may additionally be a blind corner, e.g. based on one or more obstructions to the driver. Furthermore, the curve 52 on the roadway may have an associated grade or changing grade, and the environmental conditions, e.g. weather and roadway condition, may affect the traction surface of the roadway. The roadway condition may refer to whether the road is a paved or unpaved surface, and the like.

The control system 22 and electronic horizon system 32 determine that the upcoming curve 52 is within a predetermined time (Δt) of vehicle 10 travel or position to implement the control strategy for the vehicle as described herein. In one example, the control system 22 and electronic horizon system 32 are monitoring the roadway, and initiate the control strategy when the curve is ten to fifteen seconds ahead of the present vehicle position. In other examples, other times, e.g. less than ten seconds or more than fifteen seconds are also contemplated.

Figure 3:
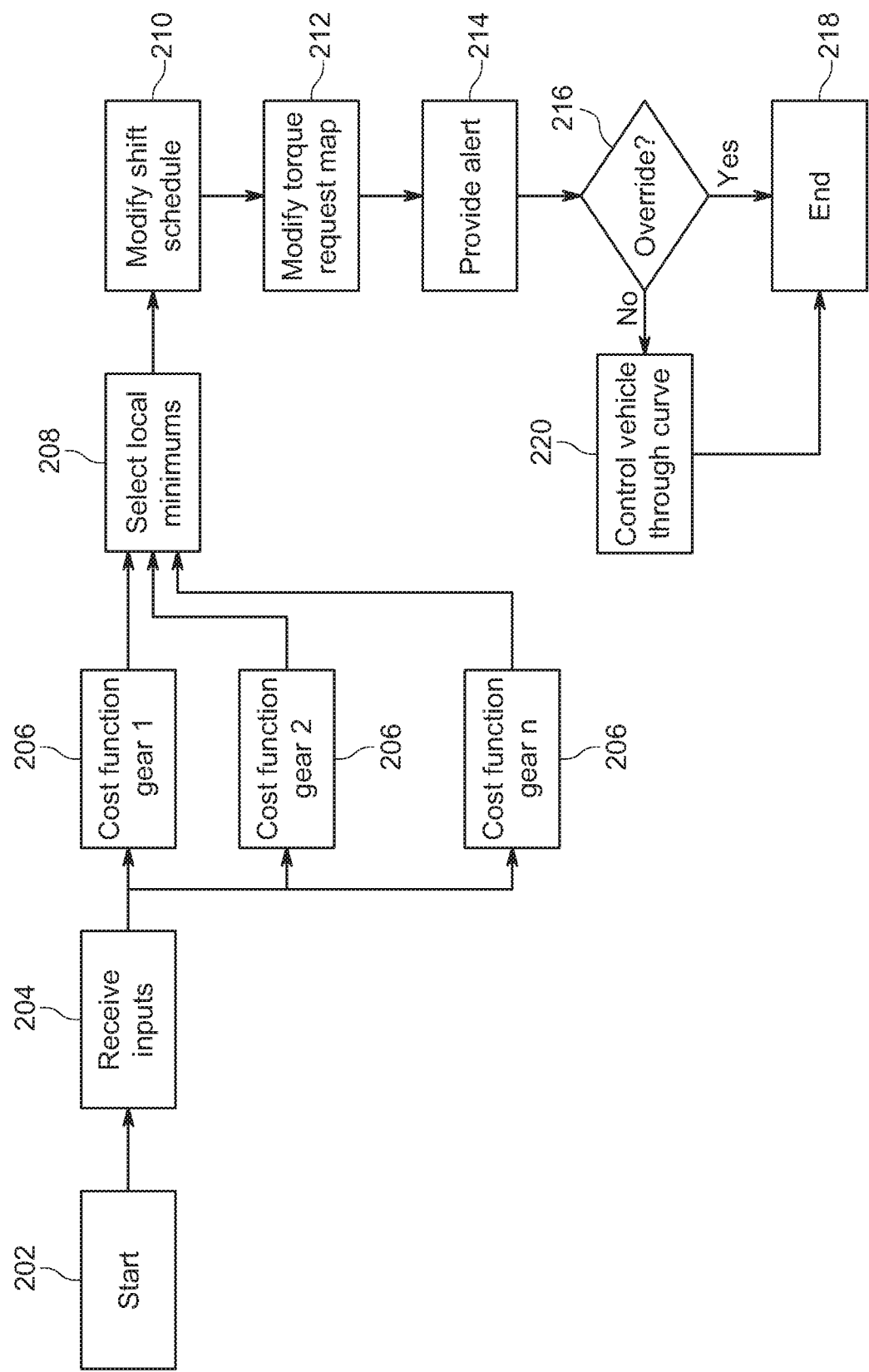
FIG. 3 illustrates a flow chart for a method of controlling the vehicle of FIG. 1 in the scenario of FIG. 2 according to an embodiment.

FIG. 3 illustrates a flow chart for a method 200 according to the present disclosure. The method may be used to control the vehicle 10 of FIG. 1 according to various embodiments. The method 200 may be implemented by a controller such as the controller and control system 22 in FIG. 1. In other examples, various steps may be omitted, added, rearranged into another order, or performed sequentially or simultaneously. Although the method 200 is described with respect to use with a vehicle 10 as shown in FIG. 1, the method may likewise be applied for use with a vehicle with another architecture as described above with respect to FIG. 1. At step 202, the method 200 starts.

At step 204, the controller 22 receives inputs, such as the first, second, and third inputs. The controller 22 is configured to receive a first input indicative of a vehicle state. The vehicle state may include a present vehicle speed. The first input may additionally or alternatively include a predicted vehicle speed in a curve along a vehicle path within a predetermined time interval of the present vehicle position based on data from the electronic horizon system.

The controller 22 is also configured to receive a second input indicative of a curve along a vehicle path within a predetermined time interval of the present vehicle position from the electronic horizon system 32. The predetermined time interval may be on the order of five seconds, ten seconds, fifteen seconds, twenty seconds, or more. The second input may additionally include information related to the grade of the vehicle path within the predetermined time interval.

The controller 22 may additionally receive other data as a third input indicative of an environmental state, and this data may be representative of a grade of the vehicle path within the predetermined time interval such as grade, a speed limit set for the vehicle path, an environmental condition such as precipitation or ambient temperature, a road condition indicative of the roadway surface, and the like.

The controller 22 is configured to predict a vehicle lateral acceleration in the curve ahead, and compare the predicted vehicle lateral acceleration to first and second threshold values. The first threshold value is higher than the second threshold value, and the comparison of the vehicle lateral acceleration in relation to the first and second threshold values trigger differing vehicle control strategies.

At step 206, the controller 22 uses a cost optimizer function to determine an operating point or state for the vehicle based on the inputs and the expected or predicted vehicle state in the curve or roadway ahead. The controller 22 may perform a separate cost optimizer function for each gear in the transmission, with only the function block for the first and second gears of the transmission shown in FIG. 3. The method 200 and controller 22 may use a hybrid model predictive cost function. In one example, the controller 22 performs an iterative process using one or more of the following as inputs: fuel, brake, weight, lateral acceleration, target velocity, and change in velocity from actual to target, with each input assigned an associated cost. The costs associated with each input may be based on a weighted function with the cost weights being same as one another or may vary depending on the input. Alternatively, the costs may be based on an exponential function. The controller 22 creates a three-dimensional surface or map for each gear that plots a fuel usage, a target velocity, and a vehicle lateral acceleration in the curve. The controller 22 then determines a local minimum for the three-dimensional map, and proceeds to block 208 when the minimum cumulative cost is found.

For each gear at step 206, the controller 22 may estimate the likely costs and the target velocity, calculate the actual costs, and perform these steps as an iterative process until the costs to reach a minimum cost or minimum target velocity are reached.

At block 208, the controller 22 compares the local minimums from each of the gears from blocks 206, and selects the one with the lowest cumulative cost that also meets specified criteria for the vehicle 10 such as a lateral vehicle acceleration that is below a threshold value, a vehicle speed through the curve that is less than a specified speed, or the like. The controller 22 may use a cost optimizer function at block 208 as well, with a cost associated with each gear to determine the result.

At step 210, the controller 22 modifies the shift schedule for the transmission 18 based on the results from block 208. The controller 22 may modify the shift schedule by identifying the desired downshift based on the inputs and the cost optimizer function results. The controller 22 may further modify the shift schedule by blocking one or more shifts within the event or curve horizon, e.g. within the predetermined time interval.

Figure 4:
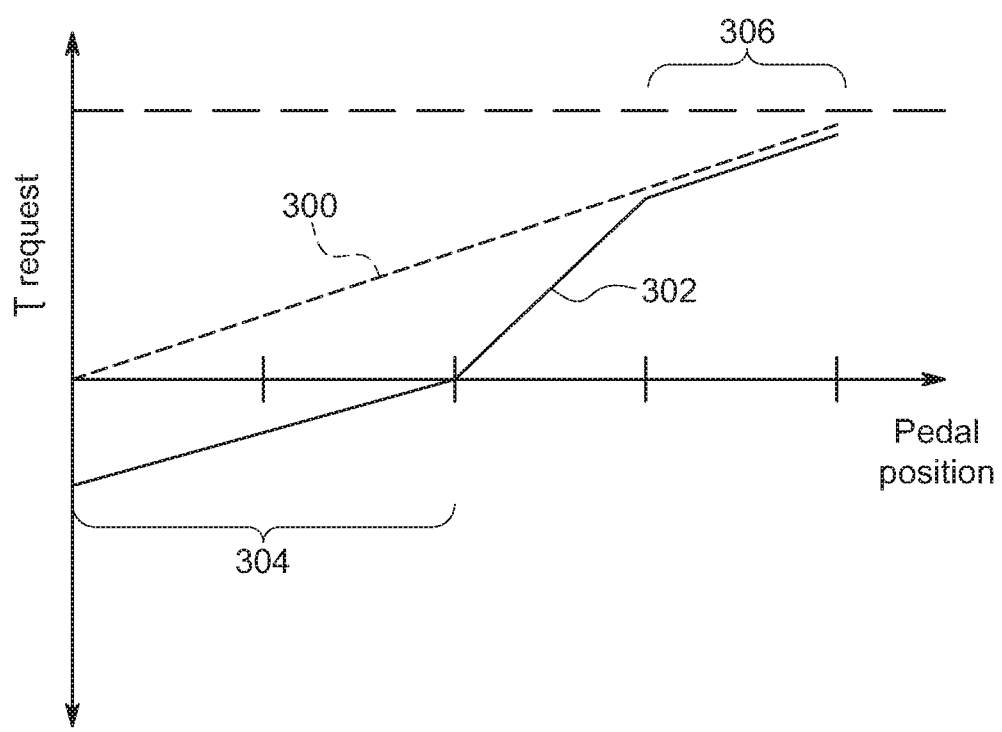
FIG. 4 illustrates a simplified modified torque request map according to an embodiment and resulting from the method of FIG. 3.

At step 212, the controller 22 modifies the torque request map, or accelerator pedal map, based on the results from block 208. An example of a modification of an accelerator pedal map is shown in FIG. 4. FIG. 4 illustrates torque request from the prime mover(s) 12 as a function of the accelerator pedal position as measured by the APPS. The production or unmodified torque request map 300 is shown with a broken line, while the modified torque request map 302 is shown with a solid line. As can be seen from the Figure, the modified map provides engine braking through a first range 304 of pedal travel, and also provides the same torque as the unmodified map through another range 306 of pedal travel.

Referring back to FIG. 3, at step 214, the controller 22 provides an alert to the user. The controller 22 is configured to output a first user notification to the user interface 24 in response to the predicted vehicle lateral acceleration being above the first threshold value.

The controller 22 is also configured to output a second user notification to the user interface 24 in response to the predicted vehicle lateral acceleration being below the first threshold value and above the second threshold value.

At step 216, the controller 22 determines if the occupant or user has overridden the control strategy. The vehicle occupant or driver may override the transmission 18 downshift and/or the driver torque request map modification by providing a user input to the user interface 24.

If the occupant has overridden the control strategy, the method 200 proceeds to block 218 and ends. If the occupant has not overridden the control strategy, the method 200 proceeds to block 220.

At step 220, the controller 22 controls the vehicle 10 through the event or curve by downshifting the transmission 18 when the first and second inputs predict a vehicle lateral acceleration in the curve above a first threshold value, and modifying the driver torque request map associated with the accelerator pedal to reduce a percentage of pedal travel associated with positive drive torque when the first and second inputs predict a vehicle lateral acceleration in the curve above the first threshold value. In response to the predicted vehicle lateral acceleration, the controller 22 may modify the transmission shift schedule in order to cause the downshift. The controller 22 may be further configured to downshift the transmission 18 and modify the accelerator pedal map when the first input indicative of the vehicle state, second input indicative of the curve, and the third input indicative of the environmental state predict the vehicle lateral acceleration in the curve being above the first threshold value.

At step 222, the controller 22 is further configured to downshift the transmission 18 without modifying the driver torque request map when the first and second inputs predict the vehicle lateral acceleration in the curve below the first threshold value and above the second threshold value.

The transmission 18 is downshifted and/or the driver torque request map is modified prior to the vehicle 10 entering the curve 52.

The method then ends at block 222.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   an accelerator pedal in communication with a prime mover;
   a transmission;
   an electronic horizon system; and
   a controller in communication with the prime mover and the accelerator pedal, the transmission, and the electronic horizon system, the controller configured to, in response to receiving a first input indicative of a vehicle state and a second input indicative of a curve along a vehicle path within a predetermined time interval from the electronic horizon system, downshift the transmission and modify a driver torque request map associated with the accelerator pedal to reduce a percentage of pedal travel associated with positive drive torque when the first and second inputs predict a vehicle lateral acceleration in the curve above a first threshold value.

2. The vehicle of claim 1 wherein the controller is further configured to, in response to receiving the first input and the second input, downshift the transmission without modifying the driver torque request map when the first and second inputs predict the vehicle lateral acceleration in the curve below the first threshold value and above a second threshold value, wherein the second threshold value is less than the first threshold value.

3. The vehicle of claim 1 wherein the electronic horizon system further comprises a navigation system; and
   wherein the prime mover further comprises an engine.

4. The vehicle of claim 1 wherein the vehicle state associated with the first input is a vehicle speed.

5. The vehicle of claim 1 wherein the controller is further configured to modify a transmission shift schedule such that the transmission is downshifted.

6. A method of controlling a vehicle comprising:
   receiving a first signal indicative of a vehicle state;
   receiving a second signal from an electronic horizon system indicative of a curve along a vehicle path within a predetermined time interval; and
   downshifting a transmission and modifying a driver torque request map associated with an accelerator pedal to reduce a percentage of pedal travel associated with positive drive torque when the vehicle state and the curve predict a vehicle lateral acceleration in the curve being above a first threshold value.

7. The method of claim 6 further comprising downshifting the transmission without modifying the driver torque request map when the vehicle state and the curve predict the vehicle lateral acceleration in the curve being below the first threshold value and above a second threshold value, wherein the second threshold value is less than the first threshold value.

8. The method of claim 7 further comprising:
outputting a first user notification to a user interface in response to the predicted vehicle lateral acceleration being above the first threshold value;
outputting a second user notification to the user interface in response to the predicted vehicle lateral acceleration being below the first threshold value and above the second threshold value; and
overriding the transmission downshift and the driver torque request map modification in response to receiving a user input from the user interface.

9. The method of claim 6 further comprising modifying at least one of a transmission shift schedule and the driver torque request map by calculating a three-dimensional map plotting a fuel usage, a target velocity, and a vehicle lateral acceleration in the curve.

10. The method of claim 9 wherein a local minimum for the target velocity in the three-dimensional map is used to modify the at least one of the transmission shift schedule and the driver torque request map.

11. The method of claim 6 further comprising receiving a third signal indicative of an environmental state;
wherein the transmission is downshifted and the driver torque request map is modified when the vehicle state, the curve, and the environmental state predict the vehicle lateral acceleration in the curve being above the first threshold value.

12. A vehicle comprising:
an accelerator pedal in communication with a prime mover;
a transmission; and
a controller configured to, in response to receiving a first input indicative of a vehicle state and a second input indicative of a curve along a vehicle path within a predetermined time interval, downshift the transmission and modify a driver torque request map associated with the accelerator pedal to reduce a percentage of pedal travel associated with positive drive torque.

13. The vehicle of claim 12 wherein the controller is further configured to modify a transmission shift schedule in response to receiving the first and second inputs thereby causing the transmission to downshift.

14. The vehicle of claim 12 wherein the transmission is downshifted and the driver torque request map is modified prior to the vehicle entering the curve.

15. The vehicle of claim 12 further comprising a user notification system in communication with the controller;
wherein the controller is further configured to output a notification to the user notification system prior to downshifting the transmission and modifying the driver torque request map.

16. The vehicle of claim 15 further comprising a user interface;
wherein the controller is configured to receive a user input overriding the transmission downshift and the driver torque request map modification.

17. The vehicle of claim 12 wherein the vehicle state for the first input includes at least one of a present vehicle speed and a predicted vehicle speed in the curve.

18. The vehicle of claim 12 further comprising an electronic horizon system with a global positioning system in communication with the controller, wherein the electronic horizon system is configured to provide data indicative of the second input to the controller.

19. The vehicle of claim 12 wherein the second input is also indicative of a grade along the vehicle path.

20. The vehicle of claim 12 wherein the prime mover is an internal combustion engine.

* * * * *